(12) United States Patent
Filipp

(10) Patent No.: US 9,387,645 B2
(45) Date of Patent: Jul. 12, 2016

(54) LOCALIZED THICKENING OF A DECORATIVE SKIN

(71) Applicant: Faurecia Interior Systems, Inc., Auburn Hills, MI (US)

(72) Inventor: William Filipp, Shelby Township, MI (US)

(73) Assignee: Faurecia Interior Systems, Inc., Auburn Hills, MI (US)

( * ) Notice: Subject to any disclaimer, the term of this patent is extended or adjusted under 35 U.S.C. 154(b) by 28 days.

(21) Appl. No.: 14/466,286

(22) Filed: Aug. 22, 2014

(65) Prior Publication Data

US 2016/0052230 A1    Feb. 25, 2016

(51) Int. Cl.
*B05D 1/10* (2006.01)
*B05D 1/12* (2006.01)
*B29C 44/14* (2006.01)
*B29C 51/08* (2006.01)
*B32B 5/18* (2006.01)
*B32B 38/12* (2006.01)
*B60R 13/02* (2006.01)
*B32B 5/06* (2006.01)
*B32B 38/00* (2006.01)
*B32B 3/26* (2006.01)

(Continued)

(52) U.S. Cl.
CPC ... *B32B 5/06* (2013.01); *B05D 1/10* (2013.01); *B05D 1/12* (2013.01); *B29C 44/146* (2013.01); *B29C 51/08* (2013.01); *B29C 51/266* (2013.01); *B32B 3/263* (2013.01); *B32B 5/18* (2013.01); *B32B 38/0012* (2013.01); *B32B 38/12* (2013.01); *B60R 13/02* (2013.01); *B60R 13/0256* (2013.01); *B60R 13/0262* (2013.01); *B29L 2031/3005* (2013.01); *B29L 2031/3008* (2013.01); *B29L 2031/3041* (2013.01); *B32B 2250/03* (2013.01); *B32B 2255/26* (2013.01); *B32B 2451/00* (2013.01); *B32B 2605/003* (2013.01)

(58) Field of Classification Search
CPC .......... B05D 1/10; B05D 1/12; B29C 44/146; B29C 51/08; B29C 51/266; B29L 2031/3005; B29L 2031/3008; B29L 2031/3014; B29L 2031/3041; B32B 3/263; B32B 5/18; B32B 5/20; B32B 37/15; B32B 37/24; B32B 2037/243; B32B 38/12; B32B 2255/26; B32B 2451/00; B32B 2605/003; B60R 13/02; B60R 13/0237; B60R 13/0243; B60R 13/0256; B60R 13/0262
See application file for complete search history.

(56) References Cited

U.S. PATENT DOCUMENTS 4,632,309 A * 12/1986 Reimer ................... B05B 7/205
                                                        239/8
5,285,967 A *  2/1994 Weidman ............... B05B 7/205
                                                      239/132.1

(Continued)

FOREIGN PATENT DOCUMENTS

DE           10054549 A1 *  5/2002

*Primary Examiner* — Michael Tolin
(74) *Attorney, Agent, or Firm* — Reising Ethington P.C.

(57) ABSTRACT

A vehicle interior panel includes a decorative skin and a polymer coating provided to increase material thickness at a desired portion of the decorative skin The polymer coating may be formed by a thermal spraying process in which a polymeric material is heated and deposited along an inner side of the decorative skin The decorative skin may be thermoformed from a uniformly thick sheet of thermoplastic material so that it includes a reduced thickness portion after forming. The polymeric material can be deposited along the reduced thickness portion to form the polymer coating, thereby restoring integrity or providing enhanced integrity to the decorative skin to aid subsequent material processes such as sewing or foam backfilling.

12 Claims, 2 Drawing Sheets

(51) Int. Cl.
    *B29C 51/26*    (2006.01)
    *B29L 31/30*    (2006.01)

(56) References Cited

U.S. PATENT DOCUMENTS

| | | | | |
|---|---|---|---|---|
| 6,136,415 A | * | 10/2000 | Spengler | B29C 44/569 |
| | | | | 264/46.6 |
| 7,661,740 B2 | * | 2/2010 | Saito | B60R 13/02 |
| | | | | 296/1.08 |
| 7,851,039 B2 | * | 12/2010 | Boinais | B29C 44/351 |
| | | | | 428/102 |
| 9,067,544 B2 | * | 6/2015 | Davies | B60R 13/02 |
| 2013/0260086 A1 | * | 10/2013 | Zellner, Jr. | B60R 13/02 |
| | | | | 428/102 |

\* cited by examiner

LOCALIZED THICKENING OF A DECORATIVE SKIN

TECHNICAL FIELD

The present disclosure relates generally to vehicle interior panels with decorative skins and methods of making decorative skins for use with vehicle interior panels.

BACKGROUND

Vehicle interior panels typically include a decorative aspect, providing the passenger cabin of a vehicle with a desired aesthetic. Combinations of different types of materials, textures, shapes, tactile features, and visual features can be used with such panels to provide the passenger cabin with any of a variety of different ambiences, from luxurious to utilitarian. Modern materials can be shaped into complex contoured shapes and are used extensively in vehicle interiors due to the available design freedom. For example, plastic injection molding can be used to shape polymer-based materials into nearly any three-dimensional shape in a single process, and thermoforming can be used to shape a polymer-based sheet material to include nearly any three-dimensional contour. As vehicle interior designers seek to differentiate their products from others, certain limitations of these materials and processes have come to light. For instance, thermoforming processes stretch the sheet material being formed, and the sheet material can only stretch so far before breaking or otherwise losing integrity.

Japanese publication JPS59232816 by Masamichi et al. discloses a thermoforming process in which an excess material portion is provided in advance of the thermoforming process to reinforce a particular portion of the formed material to have the desired strength in the finished product, such as an armrest.

SUMMARY

A method of making a vehicle interior panel may include the steps of: (a) providing a decorative skin having a pre-formed shape and an outer side that provides at least part of a visible side of the panel when installed in the vehicle; (b) depositing a polymeric material along a portion of the decorative skin at an opposite inner side of the decorative skin by thermal spraying; and (c) disposing the decorative skin over a vehicle interior panel substrate. Depositing the polymeric material along the decorative skin increases the material thickness at said portion of the decorative skin The portion of the decorative skin along which the polymeric material is deposited may have a thickness that is less than another portion of the decorative skin before step (b).

The method may include sewing a line of stitching through the decorative skin along the portion of the decorative skin along which the polymeric material is deposited.

The method may include disposing a foam layer between the decorative skin and the substrate.

The pre-formed shape may be a three-dimensional shape.

The decorative skin provided in step (a) may be thermoformed from a flat and uniformly thick sheet of thermoplastic material to include the pre-formed shape.

The polymeric material may have substantially the same material composition as the portion of the decorative skin along which the polymeric material is deposited.

The polymeric material may be reclaimed from other decorative skins, and the other decorative skins may be cryogenically granulated.

The method may include thermoforming a flat and uniformly thick sheet of thermoplastic material into the decorative skin provided in step (a) such that the portion of the decorative skin along which the polymeric material is deposited in step (b) is a reduced thickness portion of the decorative skin provided in step (a).

After step (b), the material thickness at the portion of the decorative skin along which the polymeric material is deposited may be greater than or equal to the thickness of the flat and uniformly thick sheet of thermoplastic material from which the decorative skin was thermoformed.

The method may include sewing a line of stitching through the decorative skin along the portion of the decorative covering along which the polymeric material is deposited and at least partially filling a space between the decorative skin and the substrate with a foamable resin to form a foam layer.

A vehicle interior panel may include a decorative skin disposed over a substrate. The decorative skin has an outer side that provides at least a portion of a visible side of the panel, along with an opposite inner side facing toward the substrate and a reduced thickness portion. The vehicle interior panel may also include a polymer coating on the inner side of the decorative skin at the reduced thickness portion. The polymer coating has a thickness that compensates for the amount of reduced thickness of the reduced thickness portion.

The vehicle interior panel may include a line of stitching sewn through the reduced thickness portion of the decorative skin.

A vehicle instrument panel may include the vehicle interior panel.

It is contemplated that the various features set forth in the preceding paragraphs, in the claims and/or in the following description and drawings may be taken independently or in any combination thereof. For example, features disclosed in connection with one embodiment are applicable to all embodiments, except where there is incompatibility of features.

BRIEF DESCRIPTION OF THE DRAWINGS

One or more embodiments will hereinafter be described in conjunction with the appended drawings, wherein.

DETAILED DESCRIPTION

Described below is a vehicle interior panel that includes a decorative skin with a locally modified thickness. The described process can locally add material thickness to the decorative skin after it is formed to a desired contour. The process includes heating and depositing a granulated polymeric material on an inner side of the skin to provide the additional material thickness. The ability to add thickness to the decorative skin at specific locations can provide integrity for subsequent processes, such as sewing and/or foam back-filling processes.

Figure 1:
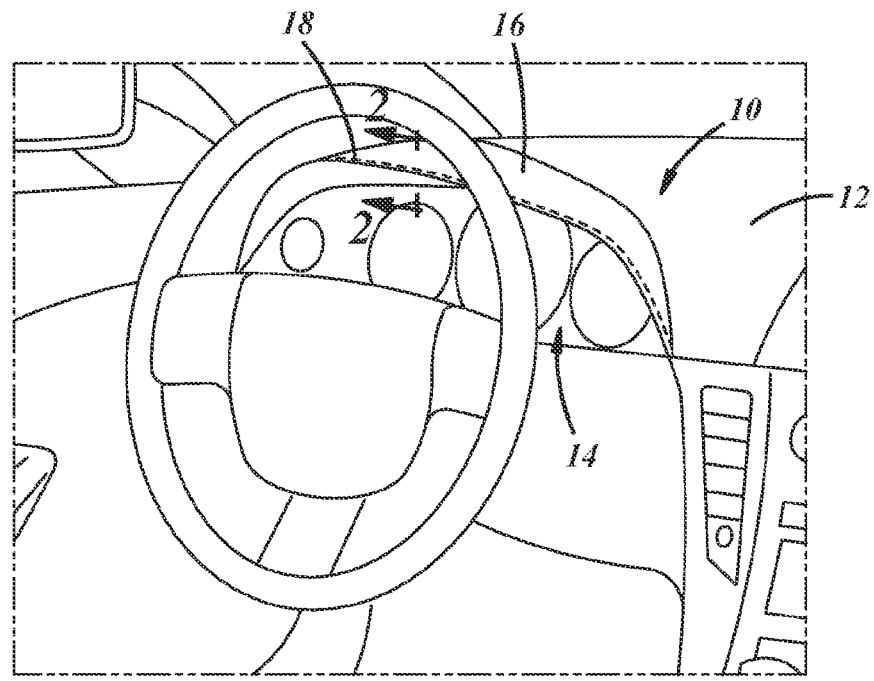
FIG. 1 is a perspective view of the interior of a vehicle passenger cabin, including a vehicle interior panel with a decorative skin.

FIG. 1 is a perspective view of the interior of a vehicle passenger cabin, including a vehicle interior panel 10 with a decorative skin 12. The particularly illustrated panel 10 is an instrument panel, and the portion of the panel depicted in the figure is the driver side of the instrument panel, which includes a driver information center 14. A brow portion 16 of the instrument panel 10 extends over the information center 14 and functions to enhance visibility of the information center. The prominent protruding shape of the illustrated brow portion 16 is one example of a shape that highlights some of the limitations of forming processes such as thermoforming. For instance, where it is desired to thermoform the visible decorative skin 12 of the panel 10 from a single piece of material, which extends from the vehicle windshield and wraps over top and bottom sides of the brow portion 16 in the example of FIG. 1, a sheet of thermoplastic material is subjected to extensive stretching during the thermoforming process. Too much stretching can tear the sheet material or thin the material to an extent that adversely affects subsequent processes, such as sewing or foam backfilling processes.

The illustrated panel 10 includes a line of decorative stitching 18, provided to simulate a luxurious cut-and-sew look in the vehicle interior. The stitching 18 is located along a portion of the panel 10 where material thinning from thermoforming may be prevalent in one or more material layers of the panel. Sewing through material that is too thin can lead to wrinkling and/or tearing of the material during the sewing process. Vehicle interior designers have thus been limited by material and process restraints and sometimes prevented from including decorative features such as stitching along deep-drawn areas of thermoformed components. The process and related products described below address this and other limitations of conventional vehicle interior panel manufacturing processes.

While illustratively described in conjunction with the figures for use with sheet material thinned by thermoforming prior to a sewing process, local modification of the material thickness of a vehicle interior panel component as described herein is applicable to panel materials formed by other techniques such as slush molding that sometimes produce components of variable thickness. The disclosed process is applicable to flat and/or uniformly thick materials as well, where it may be desired to locally increase material thickness for a variety of reasons.

Figure 2:
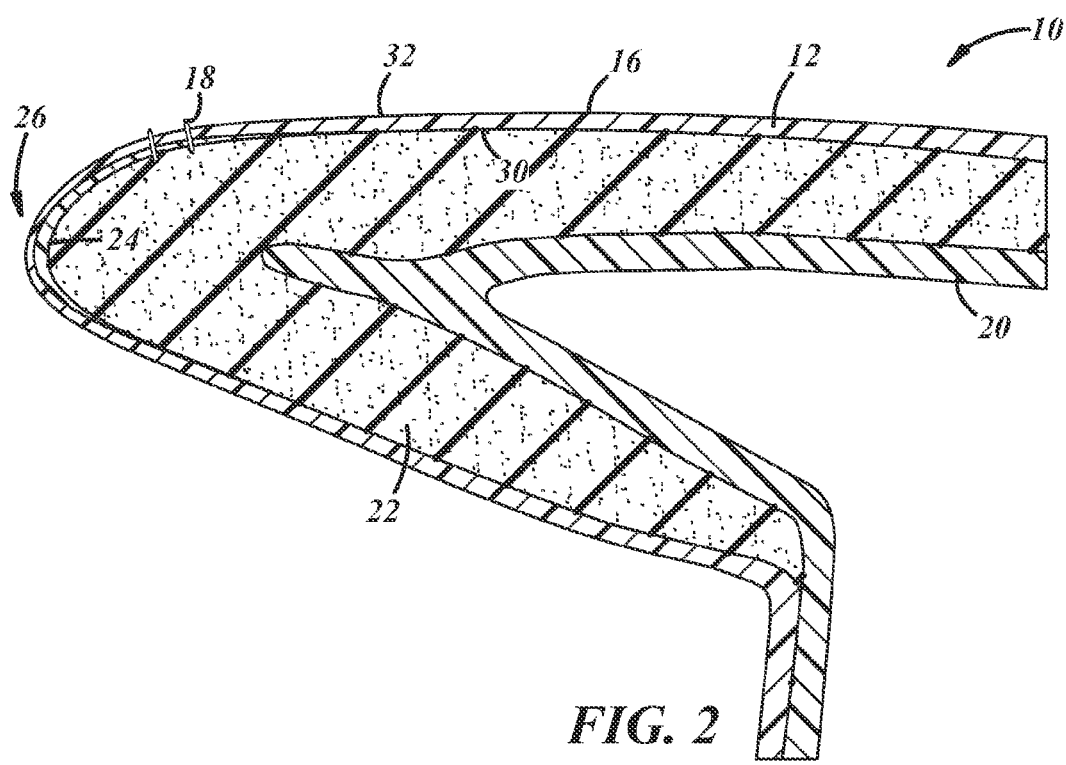
FIG. 2 is an enlarged cross-sectional view of a portion of the vehicle interior panel of FIG. 1, which includes a polymer coating at the inner side of the decorative skin.

FIG. 2 is a cross-sectional view of the brow portion 16 of panel 10 of FIG. 1. The panel 10 includes the decorative skin 12 disposed over a substrate 20. In this example, the panel 10 also includes a foam layer 22 and a polymer coating 24 located between and in contact with the substrate 20 and the decorative skin 12. One or more additional foam or non-foam layers may be included between the skin 12 and substrate and/or the foam layer 22 may be omitted. The decorative skin 12 includes a reduced thickness portion 26. The line of stitching 18 and the polymer coating 24 are located at the reduced thickness portion 26, with the stitching sewn through the decorative skin 12 and the coating 24 in this example. FIG. 2 is not necessarily drawn to scale, as certain features may be exaggerated for purposes of illustration.

The decorative skin 12, line of stitching 18, substrate 20, and foam layer 22 may be constructed using known materials and processes. For example, the substrate 20 may be formed from a semi-rigid injection molded thermoplastic material, such as glass-reinforced polypropylene. Other materials and processes may be suitable to provide the substrate 20 with the overall shape, rigidity, and structure for the panel 10. The decorative skin 12 provides a desired appearance and texture to the panel 10 and may be formed from a polymer-based material such as a thermoplastic olefin (TPO). Other polymer-based materials such as polyvinyl chloride (PVC), polyurethane (PUR), thermoplastic urethane (TPU), or a thermoplastic elastomer (TPE) may be used to form the decorative skin 12, or the decorative skin may include or be formed from natural or textile materials, such as leather or fabric. The foam layer 22 may be formed from a polyurethane foam material or any other suitable foam material. In one example, the foam layer is formed by introducing a foamable liquid resin, such as a two-part urethane formulation, in a space or gap between the substrate 20 and the decorative skin 12, and the foamable resin forms the foam layer 22 by expanding to fill the available space and adhering the cured foam layer to the adjacent layers. The foam layer 22 may alternatively be provided as a separate layer or laminated to the decorative skin 12 to together be disposed over and attached to the substrate 20, and other foam formulations are possible.

The thickness of each component of the panel 10 may vary among different implementations. Generally, the decorative skin 12 is relatively thin with respect to the substrate 20 according to their respective functions. For instance, a reinforced plastic substrate 20 may have a thickness in a range from 2.0 mm to 4.0 mm to provide sufficient structure for the panel 10, while an unreinforced polymer-based decorative skin 12 may have a nominal thickness in a range from 0.5 mm to 1.0 mm to provide sufficient flexibility to the outermost surface of the panel 10. The reduced thickness portion 26 of the decorative skin 12 has a thickness that is at least 10% less and up to 90% less than the nominal thickness of the decorative skin The reduced thickness portion 26 may have a thickness that is at least 40% less, at least 50% less, or at least 60% less that the nominal thickness. The reduced thickness portion 26 may also include the portion of the decorative skin 12 with the lowest thickness. For a thermoformed decorative skin, the nominal thickness is the thickness of the sheet material before thermoforming. Otherwise, the nominal thickness is the designed target thickness of the material.

The polymer coating 24 increases the total material thickness at the particular location along the component on which it is formed. In some embodiments, the polymer coating 24 compensates for the amount of reduced thickness associated with the reduced thickness portion 26 of the decorative skin 12. For example, where the reduced thickness portion 26 of the decorative skin 12 has a thickness at least 50% less than the nominal thickness, at least a portion of the polymer coating 24 has a thickness that is at least 50% of the nominal thickness of the decorative skin 12. The polymer coating 24 may provide additional material thickness at non-reduced thickness portions of the decorative skin 12 as well. The ability of the polymer coating 24 to selectively and locally increase material thickness is thus useful for restoring the stiffness, strength, or integrity of the material from which the decorative skin 12 is formed and thinned during forming and/or for providing added stiffness, strength, or integrity only at locations where such characteristics are desired.

In one particular example, the decorative skin 12 is thermoformed from a flat sheet of thermoplastic material with a generally uniform thickness in a range from 0.8 mm to 1.0 mm and includes a reduced thickness portion 26 with a thickness of 0.5 mm or less. In this case, at least a portion of the polymer coating 24 has a thickness in a range from 0.3 mm to 0.5 mm to compensate for the amount of reduced thickness imparted by the thermoforming process. Some decorative skin materials, such as TPO or TPO-based materials, may lose at least some useful or important material properties when reduced to a thickness below about 0.5 mm. When subjected to a sewing process, for example, such a thin portion 26 of the decorative skin 12 may become bunched or wrinkled as the feed dogs or other sewing machine components attempt to advance the decorative skin through the machine. In foam backfilling processes, such a thin portion 26 may balloon, leak, or tear under the pressure of the expanding foam. The presence of the polymer coating 24 can help prevent these and/or other problems associated with excessively thin materials.

Localized material thickening by the polymer coating 24 can also facilitate the use of materials with a lower nominal thickness even when the thickness of the coated material is uniform. For instance, embodiments of the panel 10 may include a generally flat portion where it is desired to include a line of stitching 18. The nominal thickness of the decorative skin 12 in this case may be 0.5 mm or less, with the polymer coating 24 provided to increase the material thickness only along the desired location of the stitching. The polymer coating 24 thus avoids the need to increase the nominal thickness of the entire decorative skin 12 to accommodate highly stretched or thinned areas, resulting in lower material use and more desirable haptics with materials where thinner-is-better for haptics.

Figure 3:
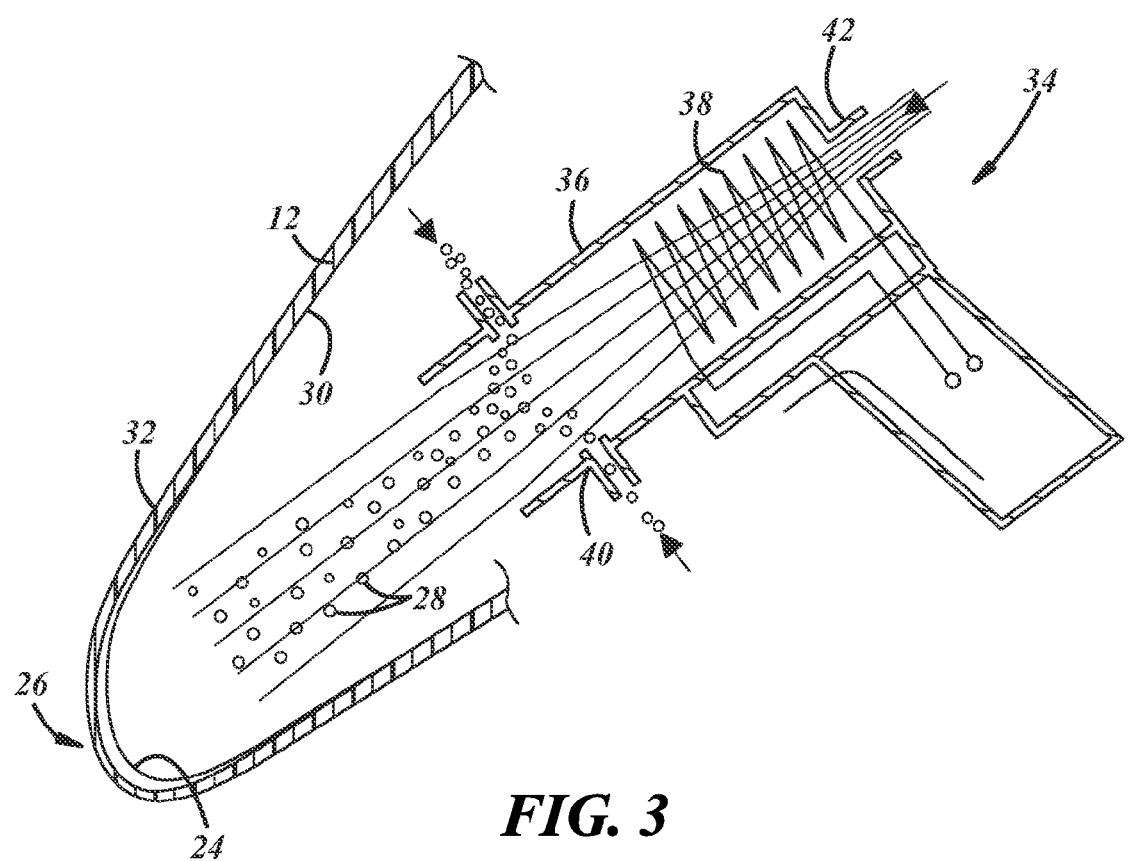
FIG. 3 is a schematic view of an illustrative method of making the decorative skin.

FIG. 3 illustrates an example of a process for forming the polymer coating 24 as part of a process for making the vehicle interior panel. In the depicted process, the decorative skin 12 is provided with a pre-formed shape, and a polymeric material 28 is deposited along a portion of the decorative skin at an inner side 30 of the decorative skin Here the pre-formed shape is a three-dimensional shape or contour, but the pre-formed shape may be a flat two-dimensional shape as well. The decorative skin 12 may be secured to a fixture (not shown) such as a vacuum fixture during the deposition process. The inner side 30 of the decorative skin 12 is opposite an outer side 32 of the skin The outer side 32 provides at least part of the decorative side of the finished panel that is visible in the passenger cabin when installed in the vehicle. The outer side 32 may include decorative features such as a surface texture, grain, or pattern. The inner side 30 of the decorative skin is the non-visible side facing toward the substrate in the finished panel.

FIG. 3 illustrates the use of a thermal spraying process in which a granulated material, such as the polymeric material 28, is heated to a molten or semi-molten state and projected at high velocity toward the surface to be coated, which in this case is the inner side 30 of the decorative skin 12. The liquefied or softened particles of material 28 impact the surface with each particle flattening and spreading out at its respective impact location, where the material then resolidifies as part of a coating, which in this case is the polymer coating 24. In this example, the portion of the decorative skin 12 along which the polymeric material 28 is deposited is the reduced thickness portion 26. The thermal spraying process increases the material thickness at the reduced thickness portion 26 of the decorative skin 12.

Thermal spraying may be performed with a thermal spraying gun 34 as shown. The thermal spraying gun 34 includes a nozzle 36, a heat source 38, intake ports 40 for the coating material, and a process gas inlet 42. In operation, a pressurized process gas is provided at the gas inlet 42 and passes along the heat source 38 and through the nozzle 36. The heat source 38 heats the process gas to a temperature sufficient to soften or melt the coating material 28. For polymeric materials, this temperature may range anywhere from 70° C. to 700° C., depending on the type of polymer and other factors. The material 28 is introduced to the heated stream of process gas, where it is liquefied or softened prior to being ejected from the nozzle 36 and impacting the surface to be coated. The illustrated heat source 38 is an electric resistance heater, but other heat sources such as combusted fuel or a flame may be employed. Where a flame is employed with polymeric materials, care should be taken to avoid direct exposure of the polymeric material particles 28 to the flame, as this could burn or otherwise change the composition of the material. Air, nitrogen, or an inert gas may be used as the process gas. The polymeric material 28 is preferably in powder form to facilitate rapid heating of each individual material particle, as larger granules may not become sufficiently molten. The polymeric material 28 may be introduced to the heated process gas stream via the intake ports 40 in the presence of a carrier gas to help the powder flow into the gas stream.

After the polymer coating 24 is applied to increase the material thickness, the decorative skin 12 may be subjected to one or more subsequent processes before, during, or after being disposed over and attached to the vehicle interior panel substrate. As described above, a line of stitching may be sewn through the decorative skin 12 along the thickened portion, including through the polymer coating 24. With some polymer coating formulations, the coated skin may be subjected to an elevated temperature or other curing process to help cure the coating 24. The coated skin 12 may be placed in a tool or fixture with the inner side 30 facing a vehicle interior panel substrate across a space or gap for a foam backfilling process as described above. A foamable resin can be applied in other ways, such as by spraying the foamable resin on the inner side 30 of the decorative skin 12 before placing it in a fixture with the substrate for foam expansion. In some embodiments, the decorative skin 12 is subjected to a polymer thermal spraying process after the line of stitching is sewn through the skin The polymer coating 24 is additionally useful to help seal needle holes formed through the decorative skin and/or through the polymer coating 24 during the sewing process. In some cases, the polymer coating 24 is formed on the decorative skin 12 only after the sewing process and not before.

The material composition of the polymeric material 28 deposited on the decorative skin 12 can affect the adhesion of the polymer coating 24 to the skin The polymeric material 28 thus preferably has a composition that is chemically compatible with the material of the portion of the decorative skin 12 along which it is deposited. The polymeric material 28 and the decorative skin material may be miscible and/or capable of forming a polymeric alloy. In some embodiments, the polymeric material 28 and the decorative skin comprise the same material and/or have the same majority polymeric component. In still other embodiments, the polymeric material 28 has substantially the same material composition as the decorative skin material, or at least the same material composition as the portion of the decorative skin along which the polymeric material is deposited. Use of substantially the same material composition facilitates a high strength bond between the polymer coating 24 and the decorative skin, as the heated polymeric material particles can soften or melt a very thin surface layer of the decorative skin on impact, effectively welding the coating to the skin Even though the decorative skin 12 and the polymer coating 24 may have the same material composition in some embodiments, the presence of the polymer coating as a distinct component of the panel is discernible under certain conditions. For instance, the roughness of the surface of the coating 24 facing away from the decorative skin may be greater than that of the surrounding uncoated inner side 30 of the decorative skin This difference in roughness may be visually noticeable on inspection of the coated skin due to differences in light reflectivity. Examination of a cross-section of the decorative skin will also reveal the presence of the polymer coating 24 in a manner similar to FIG. 2, particularly under a microscope. The coating 24 and the skin 12 may have different morphologies due to the different manners in which they were formed. For instance, a thermoformed decorative skin will have a more ordered polymer structure due to molecular alignment induced by stretching under heat in the thermoforming process, while the polymer coating will have a less ordered structure. A thermally sprayed polymer coating may also exhibit discernible boundaries among the multiple deposited particles under magnification.

One technique for ensuring material compatibility between the polymeric material 28 and the decorative skin is to make the polymeric material from other decorative skins, such as scrap or defective decorative skins or from decorative skin portions trimmed away after full panel assembly. Reclaiming material from other decorative skins for thickness-increasing deposition on newly formed decorative skins combines the advantage of reduced material waste with the above-described advantages of the polymer coating. A reclaim process may include grinding or pulverizing other decorative skins or sheet stock (e.g., defective sheet stock such as improper color, etc.) into powder form. The powdered polymeric material is then ready for heating and deposition on newly formed decorative skins via the polymer thermal spraying process of FIG. 3, for example.

One particular technique for pulverizing decorative skin material includes cryogenic grinding. In cryogenic grinding, the decorative skin material is subjected to a cryogen, such as liquid nitrogen, before and/or during grinding. Cryogenic grinding is particularly useful with the high-elongation and/or low melting point polymeric materials sometimes used in decorative skins For example, the mechanical energy used in conventional grinding can heat and or soften polymeric materials making it difficult to form particles small enough to be considered and behave as a powder. At very cold temperatures and/or in the presence of a cryogen, the softening effect of the shearing energy required to break the material into smaller pieces is reduced or eliminated.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of making a vehicle interior panel, the method comprising the steps of:
 (a) providing a decorative skin having a pre-formed shape and an outer side that provides at least part of a visible side of the panel when installed in the vehicle;
 (b) depositing a polymeric material along a portion of the decorative skin at an opposite inner side of the decorative skin by thermal spraying, thereby increasing the material thickness at said portion of the decorative skin; and
 (c) disposing the decorative skin over a vehicle interior panel substrate.

2. The method of claim 1, wherein said portion of the decorative skin has a thickness that is less than another portion of the decorative skin before step (b).

3. The method of claim 1, further comprising the step of sewing a line of stitching through the decorative skin along said portion of the decorative skin.

4. The method of claim 1, further comprising the step of disposing a foam layer between the decorative skin and the substrate.

5. The method of claim 1, wherein said pre-formed shape is a three-dimensional shape.

6. The method of claim 1, wherein the decorative skin provided in step (a) is thermoformed from a flat and uniformly thick sheet of thermoplastic material to include the pre-formed shape.

7. The method of claim 1, wherein the polymeric material has substantially the same material composition as said portion of the decorative skin along which the polymeric material is deposited.

8. The method of claim 1, wherein the polymeric material is reclaimed from other decorative skins.

9. The method of claim 8, wherein said other decorative skins are cryogenically granulated.

10. The method of claim 1, further comprising the step of:
 thermoforming a flat and uniformly thick sheet of thermoplastic material into the decorative skin provided in step (a), wherein the portion of the decorative skin along which the polymeric material is deposited in step (b) is a reduced thickness portion of the decorative skin provided in step (a).

11. The method of claim 10, wherein, after step (b), the material thickness at said portion along which the polymeric material is deposited is greater than or equal to the thickness of said flat and uniformly thick sheet of thermoplastic material of the step of thermoforming.

12. The method of claim 10, further comprising the steps of:
 sewing a line of stitching through the decorative skin along said portion of the decorative covering; and
 at least partially filling a space between the decorative skin and the substrate with a foamable resin to form a foam layer.

* * * * *